United States Patent
Stayton (10) Patent No.: US 8,049,662 B2
(45) Date of Patent: Nov. 1, 2011

(54) SYSTEMS AND METHODS FOR ANTENNA CALIBRATION

(75) Inventor: Gregory T. Stayton, Peoria, AZ (US)

(73) Assignee: Aviation Communication&Surveillance Systems LLC, Phoenix, AZ (US)

( * ) Notice: Subject to any disclaimer, the term of this patent is extended or adjusted under 35 U.S.C. 154(b) by 459 days.

(21) Appl. No.: 12/014,666

(22) Filed: Jan. 15, 2008

(65) Prior Publication Data

US 2009/0027258 A1     Jan. 29, 2009

Related U.S. Application Data

(60) Provisional application No. 60/951,402, filed on Jul. 23, 2007.

(51) Int. Cl.
 *G01S 13/00* (2006.01)
 *G01S 7/40* (2006.01)
(52) U.S. Cl. ............ 342/174; 342/29; 342/165; 342/173
(58) Field of Classification Search .............. 342/29–32, 342/165, 173, 174
 See application file for complete search history.

(56) References Cited

U.S. PATENT DOCUMENTS

| | | | | |
|---|---|---|---|---|
| 4,488,155 A | * | 12/1984 | Wu | 342/376 |
| 4,855,748 A | * | 8/1989 | Brandao et al. | 342/455 |
| 4,899,157 A | | 2/1990 | Sanford et al. | |
| 4,926,184 A | * | 5/1990 | Galati et al. | 342/149 |
| 4,994,813 A | * | 2/1991 | Shiramatsu et al. | 342/360 |
| 5,008,844 A | * | 4/1991 | Kyriakos et al. | 702/106 |
| 5,122,808 A | | 6/1992 | Kyriakos | |
| 5,191,340 A | * | 3/1993 | Brandao et al. | 342/373 |
| 5,191,349 A | * | 3/1993 | Dinsmore et al. | 343/751 |
| 5,263,189 A | * | 11/1993 | Kultgen et al. | 455/276.1 |
| 5,339,086 A | * | 8/1994 | DeLuca et al. | 342/371 |
| 5,387,915 A | * | 2/1995 | Moussa et al. | 342/40 |
| 5,416,466 A | * | 5/1995 | Malvaso et al. | 340/539.21 |
| 5,463,398 A | | 10/1995 | Young | |
| 5,469,172 A | * | 11/1995 | Schleder et al. | 342/174 |
| 5,546,090 A | * | 8/1996 | Roy et al. | 342/174 |
| 5,644,316 A | * | 7/1997 | Lewis et al. | 342/174 |
| 5,657,023 A | * | 8/1997 | Lewis et al. | 342/174 |
| 5,835,059 A | | 11/1998 | Nadel et al. | |
| 5,889,491 A | * | 3/1999 | Minter | 342/174 |
| 6,094,169 A | | 7/2000 | Smith et al. | |
| 6,133,868 A | * | 10/2000 | Butler et al. | 342/174 |
| 6,169,519 B1 | * | 1/2001 | Holecek et al. | 342/442 |
| 6,285,313 B1 | * | 9/2001 | Wahab et al. | 342/174 |
| 6,313,783 B1 | | 11/2001 | Kuntman et al. | |
| 6,329,947 B2 | * | 12/2001 | Smith | 342/418 |
| 6,339,399 B1 | * | 1/2002 | Andersson et al. | 342/372 |

(Continued)

*Primary Examiner* — Thomas Tarcza
*Assistant Examiner* — Peter Bythrow
(74) *Attorney, Agent, or Firm* — Allen J. Moss; Squire, Sanders & Demspey L.L.P.

(57) ABSTRACT

A method according to an aspect of the present invention includes determining a phase offset by simultaneously providing a calibration signal to a first element of an antenna and a second element of the antenna opposite the first element. The method further includes receiving an intermix signal by a third element of the antenna, measuring an amplitude characteristic for the intermix signal, and determining a phase offset based on the amplitude characteristic. The phase offset can be used to adjust a signal provided to the first element so that signals transmitted from the first element and second element are in phase with each other. This method can account for phase errors due to the construction or design of the antenna, and allows antenna elements to be calibrated without the need for phase detector devices.

17 Claims, 8 Drawing Sheets

U.S. PATENT DOCUMENTS

| | | | |
|---|---|---|---|
| 6,392,598 B1 * | 5/2002 | Jones et al. | 342/442 |
| 6,400,318 B1 * | 6/2002 | Kasami et al. | 342/383 |
| 6,449,469 B1 * | 9/2002 | Miyahara | 455/273 |
| 6,647,276 B1 * | 11/2003 | Kuwahara et al. | 455/562.1 |
| 6,747,594 B2 * | 6/2004 | Lindskog et al. | 342/174 |
| 6,747,595 B2 * | 6/2004 | Hirabe | 342/174 |
| 7,098,847 B2 * | 8/2006 | Li | 342/368 |
| 2003/0142012 A1 * | 7/2003 | Hirabe | 342/173 |
| 2007/0069945 A1 * | 3/2007 | Weese | 342/174 |
| 2009/0027258 A1 * | 1/2009 | Stayton | 342/174 |

* cited by examiner

SYSTEMS AND METHODS FOR ANTENNA CALIBRATION

CROSS-REFERENCE TO RELATED APPLICATION

This application claims priority to U.S. Provisional Patent Application Ser. No. 60/951,402 filed Jul. 23, 2007, the disclosure of which is incorporated herein by reference in its entirety.

DESCRIPTION OF THE INVENTION

1. Field of the Invention

The present invention relates to systems and methods for antenna calibration, and more particularly, to systems and methods for calibrating a Traffic Alert Collision Avoidance System (TCAS) directional antenna.

2. Background of the Invention

TCAS systems are currently used to help avoid collisions between aircraft. TCAS equipment aboard a monitoring aircraft periodically transmits interrogation signals that are received by transponders on other target aircraft. In response to an interrogation signal, a target aircraft's transponder transmits a reply signal. The TCAS equipment aboard the monitoring aircraft can then use information contained in the reply signal, as well as information determined from the signal (such as the bearing to the target aircraft determined from the signal) to identify potential collisions. The detailed operation of TCAS is further discussed in: *Radio Technical Commission for Aeronautics (RTCA) DO-185A*, "Minimum Operational Performance Standards for Traffic Alert and Collision Avoidance System II (TCAS II) Airborne Equipment," 1997 and *Radio Technical Commission for Aeronautics (RTCA) DO-185*, "Minimum Operational Performance Standards for Traffic Alert and Collision Avoidance System (TCAS) Airborne Equipment," 1983, both of which are incorporated herein by reference in their entirety.

Presently, TCAS systems broadcast interrogations directionally, while replies to TCAS interrogations are broadcast omnidirectionally by transponders. TCAS interrogations and transponder replies may be broadcast through a single antenna comprising an array of radiating elements, such as the antenna described in U.S. Pat. No. 5,191,349 to Dinsmore, et al., which is incorporated herein by reference in its entirety. However, the phase of the signal provided to each of the elements of the antenna must be correctly adjusted to compensate for, among other things, the phase offset due to the impedance of the cabling between the antenna and transceiver. This phase offset can vary significantly due to factors such as bending of the cable, temperature, humidity, aging, and vibration. If the phase of the signal provided to the antenna elements is not properly calibrated to account for such phase offsets, the directional or omnidirectional beam patterns emanating from the antenna may be distorted. Some conventional systems incorporate phase detector devices specifically to calibrate the phase of the signal provided to elements of an antenna. This can result in added cost and volume to TCAS systems, and still may not be able to correct for phasing errors resulting from the design or construction of the antenna itself. The present invention addresses these and other issues.

SUMMARY OF THE INVENTION

Systems and methods of the present invention may operate in conjunction with any antenna, including directional TCAS antennas comprising multiple elements. In exemplary embodiments, systems and methods according to the present invention may operate in conjunction with any TCAS system or device. One method according to the present invention includes determining a phase offset by simultaneously providing a calibration signal to a first element of an antenna and a second element of the antenna opposite the first element. The method further includes receiving an intermix signal by a third element of the antenna, measuring an amplitude characteristic for the intermix signal, and determining a phase offset based on the amplitude characteristic. The phase offset can be used to adjust a signal provided to the first element so that signals transmitted from the first element and second element are in phase with each other. This method can account for phase errors due to the construction or design of the antenna, and allows antenna elements to be calibrated without the need for phase detector devices.

A system according to another aspect of the present invention comprises a processor, an antenna, and a memory in communication with the processor and storing instructions. The processor executes the instructions in the memory to simultaneously provide a calibration signal to a first element of the antenna and a second element of the antenna opposite the first element, receive a first intermix signal by a third element of the antenna, measure an amplitude characteristic for the first intermix signal, and determine a phase offset based on the amplitude characteristic.

A method according to another aspect of the present invention includes simultaneously providing a calibration signal to a first element of an antenna and a second element of the antenna opposite the first element, where the calibration signal transmitted from the first antenna element is in phase with the calibration signal transmitted from the second antenna element. The method further includes providing the calibration signal to a third element of the antenna, receiving an intermix signal by a fourth element of the antenna, measuring an amplitude characteristic for the intermix signal, and determining a phase offset based on the amplitude characteristic. The phase offset can be used to adjust a signal provided to the third element so that signals transmitted from each of the four elements are in phase with each other.

A system according to another aspect of the present invention includes a processor, an antenna, and a memory in communication with the processor and storing instructions. The processor executes the instructions in the memory to simultaneously provide a calibration signal to a first element of the antenna and a second element of the antenna opposite the first element, wherein the calibration signal transmitted from the first antenna element is in phase with the calibration signal transmitted from the second antenna element. The processor further executes instructions in the memory to provide the calibration signal to a third element of the antenna, receive an intermix signal by a fourth element of the antenna, measure an amplitude characteristic for the intermix signal, and determine a phase offset based on the amplitude characteristic.

Both the foregoing summary and the following detailed description are exemplary and explanatory only and are not restrictive of the invention.

BRIEF DESCRIPTION OF THE DRAWINGS

A more complete understanding of the present invention may be derived by referring to the detailed description and claims when considered in connection with the following illustrative figures.

DETAILED DESCRIPTION OF EXEMPLARY EMBODIMENTS

Exemplary System

Figure 1:
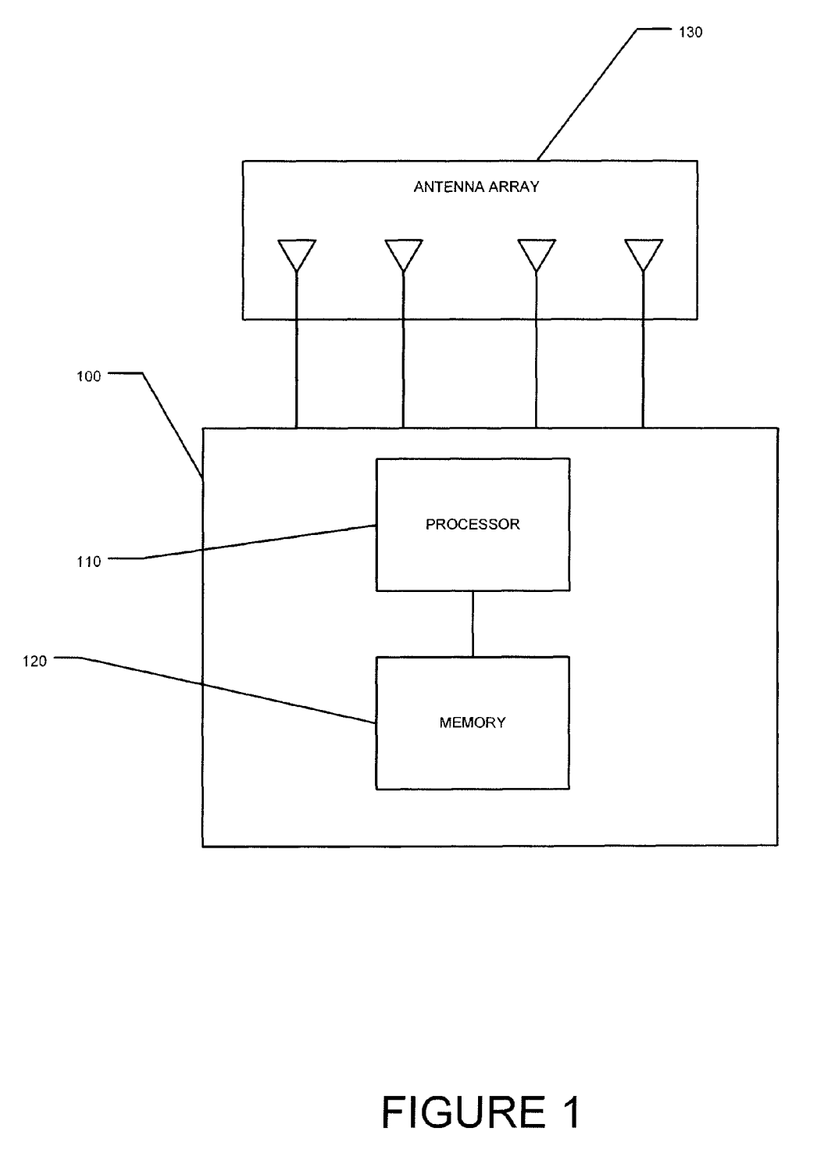
FIGS. 1 and 2 are block diagrams of an exemplary system according to various aspects of the present invention.

An exemplary system according to aspects of the present invention is depicted in FIG. 1. This system may be used in conjunction with the methods described in FIGS. 3 and 6, as well as with any subset or combination of the elements thereof. The system shown in FIG. 1 may also be used in conjunction with any other suitable embodiments of systems and methods according to various aspects of the present invention. The components of the system depicted in FIG. 1 may be included in the same device, or among a plurality of different systems or devices. For example, in one embodiment of the present invention, the components of the antenna calibration system are included in a TCAS transceiver 100 aboard an aircraft. The transceiver 100 is coupled to the antenna 130 and provides signals to each of the antenna elements 140. By employing systems and methods of the present invention, the TCAS transceiver 100 can provide the antenna 130 with appropriately-phased signals to form a desired directional or omnidirectional beam pattern from the antenna 130. The transceiver 100 may be coupled to the antenna 130 in any desired manner (e.g., via an antenna switching circuit, not shown).

A method for antenna calibration according to aspects of the present invention can be implemented in any suitable manner, such as through the processor 110 of the TCAS transceiver 100 executing software instructions stored in the memory 120. The functionality of systems operating in conjunction with the present invention may also be implemented through various hardware components storing machine-readable instructions, such as application-specific integrated circuits (ASICs), field-programmable gate arrays (FPGAs) and/or complex programmable logic devices (CPLDs). Systems for antenna calibration according to aspects of the present invention may also operate in conjunction with any desired combination of software and/or hardware components.

The processor 110 can retrieve and execute instructions stored in the memory 120 to perform methods for antenna calibration in accordance with the present invention. For example, the processor 110 may control the transceiver 100 to generate any desired output signals for transmittal via the antenna 130. Any number and type of processor(s) such as an integrated circuit microprocessor, microcontroller, and/or digital signal processor (DSP), can be used in conjunction with the present invention.

The memory 120 stores instructions, data, and any other suitable information for use by the antenna calibration system 100, as well as other systems and devices operating in conjunction with systems and methods of the present invention. The memory 120 may include any combination of different memory storage devices, such as hard drives, random access memory (RAM), read only memory (ROM), FLASH memory, or any other type of volatile and/or nonvolatile memory. Any number of memory storage devices of any size and configuration may also be used in conjunction with the present invention.

The antenna array 130 transmits and receives signals. The antenna array 130 depicted in FIG. 1 includes four directional elements 140. The elements 140 may be in any configuration, such as disposed radially around an axis of an antenna. In exemplary embodiment depicted in FIGS. 1 and 2, the antenna elements 140 are spaced radially from the center of the antenna 130 at equal intervals ninety degrees apart (i.e. at 0, 90, 180, and 270 degrees) to transmit beams. The antenna 130 may comprise any antenna that is driven by one or more transmitter output signals. The antenna 130 may include multiple antennas, each driven by a transmitter output signal; multiple antenna elements, each driven by a transmitter output signal; or multiple antenna circuits, each driven by a transmitter output signal. The antenna 130 may be positioned in any suitable location, such as attached to the surface of an aircraft. One exemplary embodiment of the present invention operates in conjunction with a TCAS directional antenna of the type described in U.S. Pat. No. 5,191,349 to Dinsmore et al. An antenna calibration system or other system operating in conjunction with the present invention can include any suitable circuit, component, device, and system for communicating with any other device.

Figure 2:
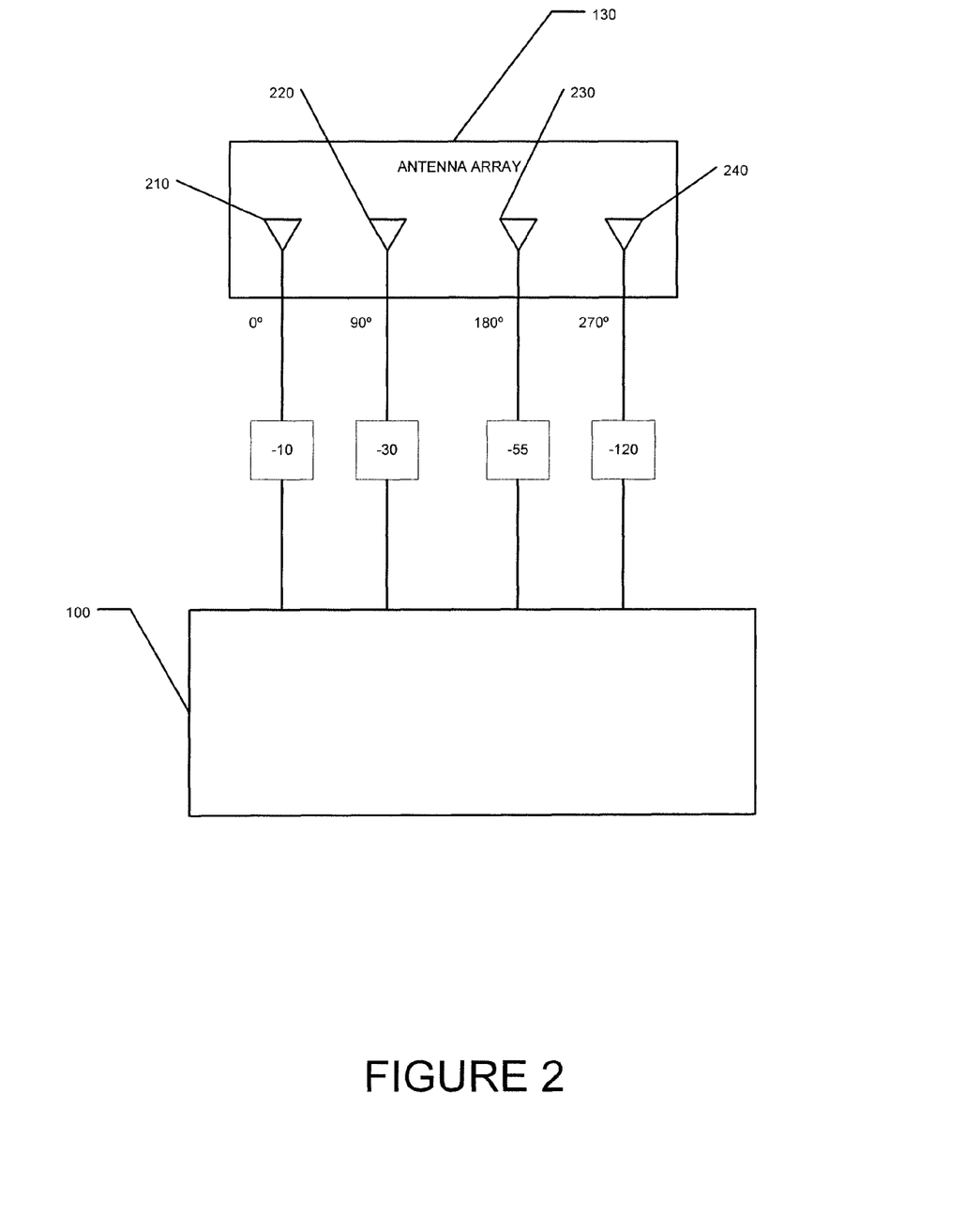

The phase relationships between signals output from the transmitter 100 to the antenna elements 140 may be affected (e.g., adversely) by the impedance of circuits in the transceiver 100 (or other systems) and by differences in propagation of signals (e.g., length and nature of conductors and paths). For example, FIG. 2 depicts exemplary phase delays associated with each of four cables connecting the transmitter 100 to four elements (210, 220, 230, and 240) of antenna 130 in FIG. 1. Hereafter, elements 210, 220, 230 and 240 may also be referred to as the 0, 90, 180, or 270-degree antenna elements, respectively. The amount a signal from the transceiver 100 is phase-shifted by each antenna cable is indicated in degrees. For example, the cable to element 210 (the 0-degree element) shifts the signal from the transmitter by −10 degrees, while the cables to elements 220, 230, and 240 shift the signal by −30, −55, and −120 degrees, respectively. In accordance with methods of the present invention described below, the phase variance due to the cables between the transmitter 100 and elements 210, 220, 230 and 240 (as well as other sources of phase variance) may be determined in order to adjust the phase of one or more of the signals provided to the antenna elements and obtain a desired beam pattern from the antenna 130.

Calibrating a Pair of Antenna Elements

Figure 3:
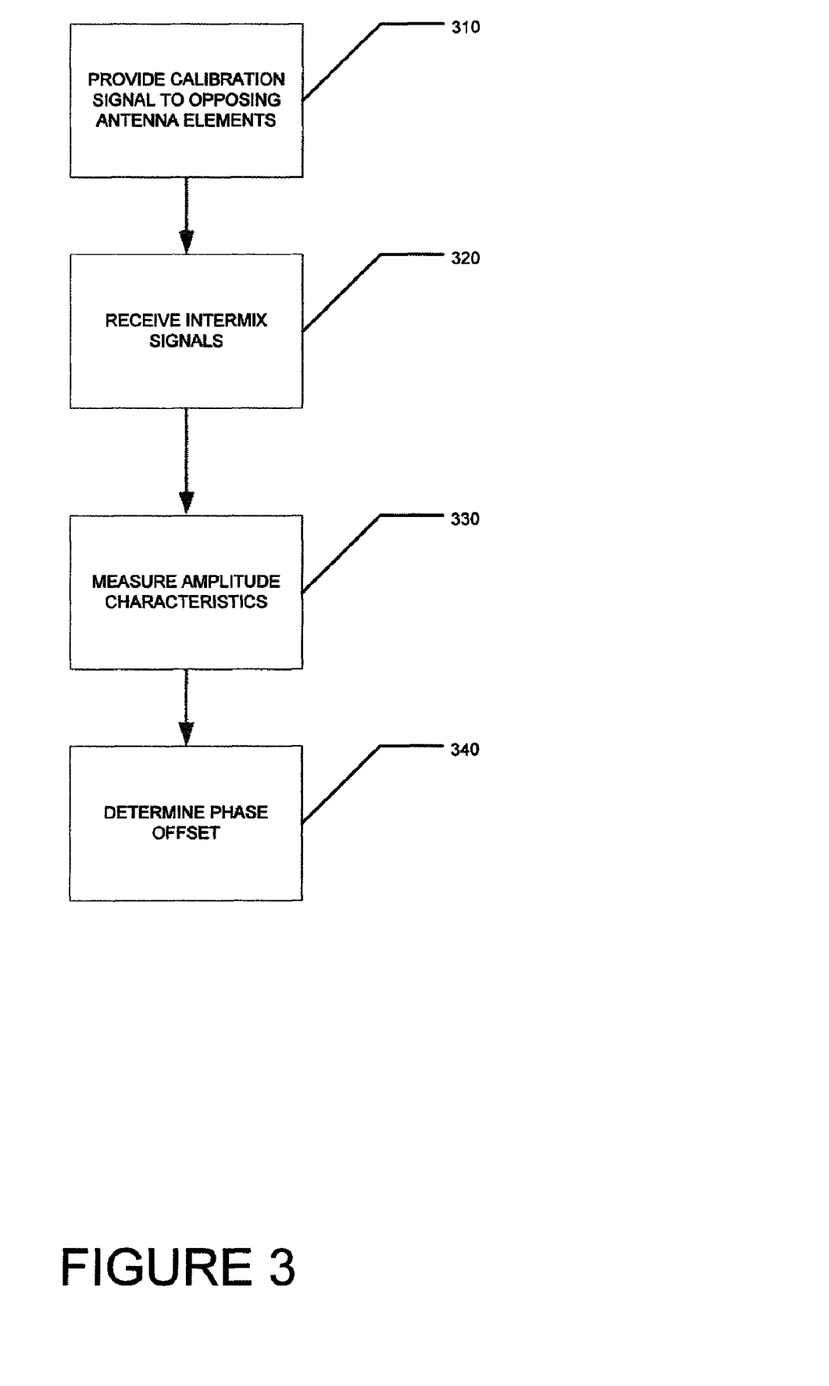
FIG. 3 depicts a flow diagram of an exemplary method according to various aspects of the present invention.
Figure 4:
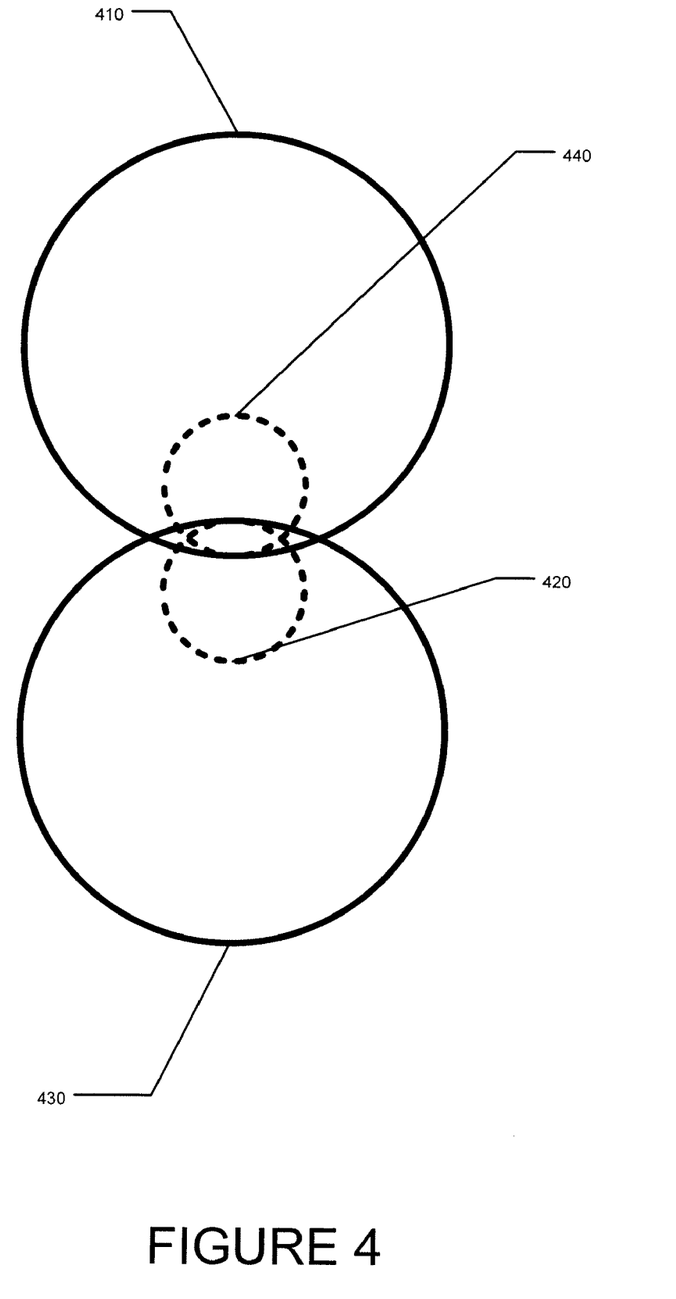
FIG. 4 illustrates an exemplary beam pattern relating to the method depicted in FIG. 3.

An exemplary method according to various aspects of the present invention is depicted in FIG. 3. In this method, signals transmitted by a pair of antenna elements can be brought in-phase with each other. In this method, a calibration signal is simultaneously provided to two antenna elements that are opposite each other (i.e. −180 degrees apart) in the antenna (310). The calibration signal is transmitted by the two opposing antenna elements and a resulting intermix signal is received by one or more adjacent antenna elements (320), i.e., the 90-degree and 270-degree elements. The calibration signal may additionally be provided to any number of the antenna elements. For example, in the case where the antenna 130 includes a beam forming network (such as an antenna of the type described in U.S. Pat. No. 5,191,349 to Dinsmore et al.), all four antenna elements can be provided with a calibration signal simultaneously. The calibration signal may comprise any frequency, amplitude and duration. The calibration signal may be modulated and/or include data. The calibration signal may be used to form any suitable beam pattern through an antenna. For example, FIG. 4 illustrates an exemplary beam pattern formed by opposing 0-degree and 180-degree elements of the antenna 130. The beam formed by the 0-degree element includes a main lobe 410 and a backlobe 420. Similarly, the beam formed by the 180-degree element is comprised of a main lobe 430 and backlobe 440. By transmitting the calibration signal simultaneously on the 0-degree and 180-degree elements, the respective backlobes (420 and 440) have power levels that are insignificant compared to the main lobes (410 and 430) such that the intermix signal received by the adjacent elements (i.e., the 90-degree and 270-degree elements) will primarily comprise the signals transmitted in the front lobes from the 0-degree and 180-degree elements.

An amplitude characteristic is measured for the intermix signal received by the one or more adjacent antenna elements (330). Any desired amplitude characteristic(s) may be measured for the intermix signal, such as a peak amplitude, trough amplitude, null, and/or any intermediate amplitude. The amplitude of the intermix signal can vary depending on the phase relationship of the signals transmitted by the opposing elements. For example, if the signals from the 0-degree and 180-degree elements that comprise the intermix signal measured by the 90-degree or 270-degree elements are 180 degrees out-of-phase with respect to each other, the amplitude of the intermix signal is nullified since the two signals will cancel each other. In a further example, if the signals from the 0-degree and 180-degree elements are in-phase with each other, the amplitude of the intermix signal will be the sum of the amplitudes of the two signals. The phase of the calibration signal provided to either opposing element (i.e. the 0-degree or 180-degree element) can be varied until a desired amplitude characteristic is measured for the intermix signal. For example, the phase of the calibration signal provided 180-degree element may be adjusted until a null amplitude is measured at either of the adjacent elements (i.e. the 90-degree or 270-degree elements).

An intermix signal (and corresponding amplitude characteristic(s)) may be measured by any number of elements in an antenna array. In the present exemplary embodiment, intermix signals from the 0-degree and 180-degree antenna elements are measured by the 90-degree and 270-degree elements, as well as one or more amplitude characteristics for each intermix signal. The amplitude characteristics of the intermix signals measured by the 90-degree and 270-degree elements can be used to determine a phase offset that can be used to adjust the signals to the 0-degree or 180-degree elements so that signals transmitted from the 0-degree and 180-degree elements are in phase with each other.

A phase offset may be determined based on one or more amplitude characteristics (340). The determined phase offset can be used to adjust the phase of one or more signals from the transceiver 100 to the antenna 130 to generate a desired beam pattern from the antenna 130. In the present exemplary embodiment, determining the phase offset includes determining the phase of the calibration signal provided to one of the opposing antenna elements (e.g., the 0-degree element) that results in a predetermined amplitude characteristic (e.g., a null) for the intermix signal measured by the adjacent antenna element (e.g., the 90-degree or 270-degree element). The phase of the signal provided to one of the two opposing elements may be adjusted until the predetermined amplitude characteristic for the intermix signal is measured. In calibrating pairs of elements in the antenna 130 (such as the 0-degree and 180-degree elements), any desired amplitude characteristic may be used. Different element pairs calibrated in the same antenna need not necessarily use the same amplitude characteristic.

The adjusted phase for the calibration signal may be used to determine the phase offset that brings the signals transmitted by the two opposing antenna elements in phase with each other. For example, a first phase for the calibration signal provided to the 0-degree antenna element that produces a null amplitude at the 90-degree element and a second phase for the calibration signal provided to the 0-degree antenna element that produces a null amplitude at the 270-degree element may be individually measured. Each of the first and second measurements may include an error due to the imperfections in the symmetry of the antenna 130. This symmetrical error can result from errors in the design, manufacturing, environment (such as water or ice on the antenna 130), and/or tolerances of the components in the antenna and will be of the same magnitude (though of opposite sign) for the first and second measured phases. For example, if the symmetrical error for the null measurement at the 90-degree element is 10 degrees, the symmetrical error for the null measurement at the 270-degree element will be −10 degrees. A phase offset based on the first and second phases can be calculated to remove the symmetrical errors as shown in the equation below:

$$\text{Phase Offset} = [(\text{Null Measurement}_1 + \text{Symmetrical Error}_1) + \text{Null Measurement}_2 - \text{Symmetrical Error}_2]]/2$$

where:
Null Measurement$_1$=Null Measurement$_2$; and
|Symmetrical Error$_1$|=|Symmetrical Error$_2$|

Since the symmetrical errors are of equal magnitude and opposite sign, they cancel out in the above equation, removing the symmetrical error from the phase offset. The phase of a signal provided to the 0-degree or 180-degree element can then be adjusted by the phase offset to bring the signals transmitted from the two elements in-phase with each other. The phase offset compensates for phase shifting due to antenna feed lines or other sources. The phase offset may be applied to any desired signal to be transmitted using the antenna 130, such as a TCAS reply signal.

Figure 5:
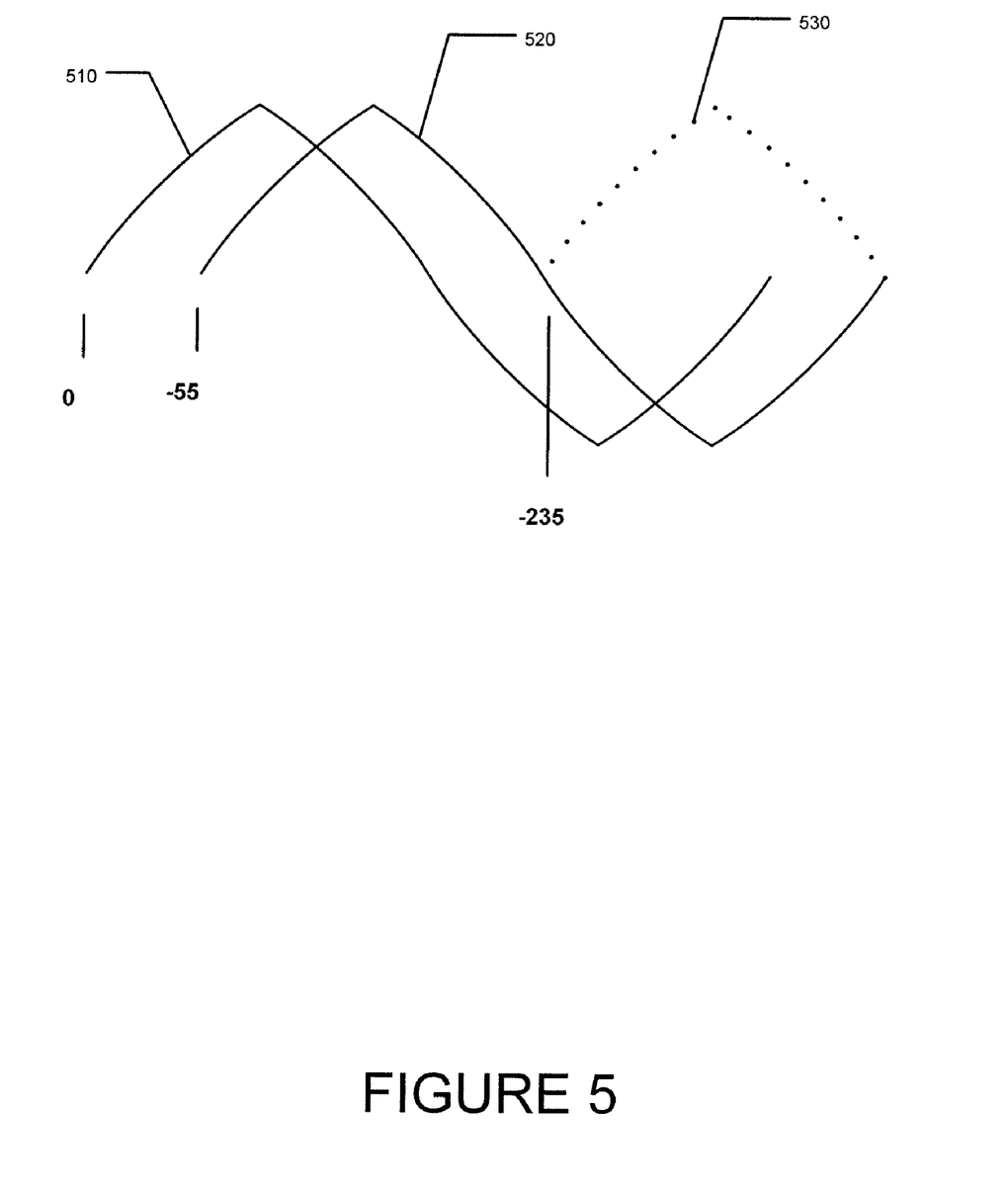
FIG. 5 is a timing diagram relating to the method depicted in FIG. 3.

FIG. 5 illustrates an exemplary phase relationship for an intermix signal for the antenna array 130 depicted in FIG. 2. The phase of a calibration signal 510 from the transceiver 100 to the 180-degree element (before passing through the cabling from the transceiver 100 to the antenna array 130) is depicted at 0 degrees phase. After passing through the antenna cabling, the calibration signal 520 becomes phase shifted by −55 degrees (by, e.g., the impedance of the cabling). In order to produce a null amplitude intermix signal at either the 90-degree or 270-degree element, the signal from the 0-degree element 210 should be −180 degrees out-of-phase from the signal from the 180-degree element 230, or at −235 degrees (−55−180=−235), as depicted by signal 530. In this example, the antenna line to the 0-degree element 210 shifts the phase of the calibration signal from the transceiver 100 by −10 degrees, so when a signal from the transceiver 100 is at −225 degrees phase, it will be shifted −10 degrees by the antenna cabling and result in the signal transmitted from the 0-degree element 210 being −180 degrees out-of-phase (−225−10=−235) with the signal from the 180-degree element 230, resulting in a null amplitude for the intermix signal received at the 90-degree element 220 or the 270-degree element 240.

While the above method has been described in the context of bringing signals transmitted by the 0-degree and 180-degree elements in phase with each other, the method may be applied to calibrate any suitable pair of antenna elements. For example, signals transmitted from the 90-degree and 270-degree elements of the antenna 130 may be calibrated using the same method. The 90-degree and 270-degree elements would become the "opposing" elements simultaneously transmitting the calibration signal as described above, and the 0-degree and 180-degree elements would become the "adjacent" elements receiving the intermix signals. Any number of other antenna elements may likewise be calibrated using systems and methods operating in accordance with the present invention.

Calibrating Multiple Pairs of Antenna Elements

In the context of the exemplary four-element antenna 130, the method of the present invention described above may be used to determine phase offsets to bring signals from the 0-degree and 180-degree elements in phase with each other, as well as to bring signals from the 90-degree and 270-degree elements in phase with each other. Additionally, a phase offset may be determined in order to bring the 0-degree/180-degree element pair in phase with the 90-degree/270-degree element pair. Bringing the signals transmitted from all four antenna elements in phase with each other can, among other things, enable the antenna 130 to transmit an undistorted omnidirectional beam pattern.

Figure 6:
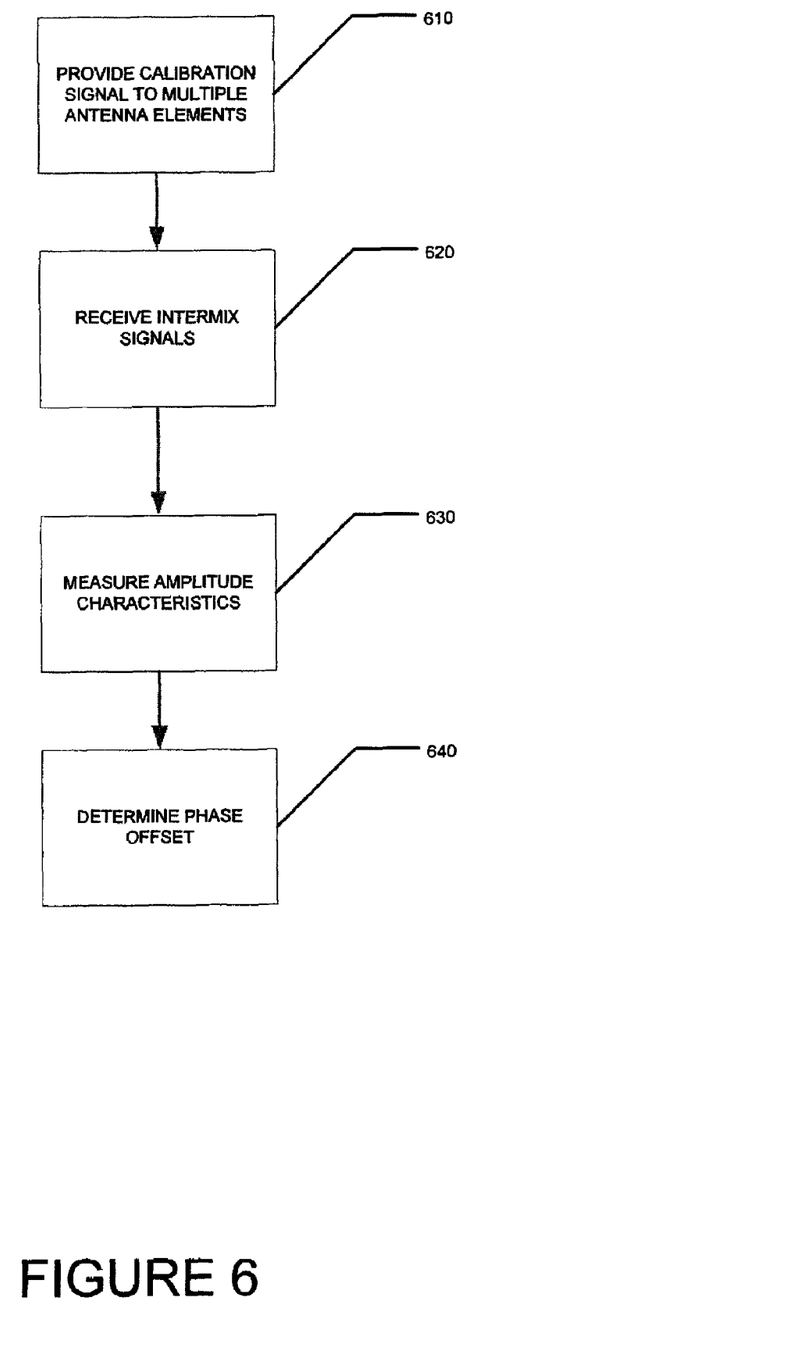
FIG. 6 depicts a flow diagram of another exemplary method according to various aspects of the present invention.

An exemplary method for calibrating two pairs of antenna elements is depicted in FIG. 6. In this method, a calibration signal is simultaneously provided to multiple antenna elements (610). In one exemplary embodiment of the present invention, a calibration signal is provided to two antenna elements that are opposite each other (i.e. −180 degrees apart) in the antenna and that produce signals that are in phase with each other. In conjunction with providing the calibration signal to the two opposing elements, the calibration signal is simultaneously provided to a third element. For example, the calibration signal can be provided to the 90-degree element 220 and 270-degree element 240 of the antenna 130 (which transmit the calibration signal in phase with each other), as well as to the 180-degree element 230.

Figure 7:
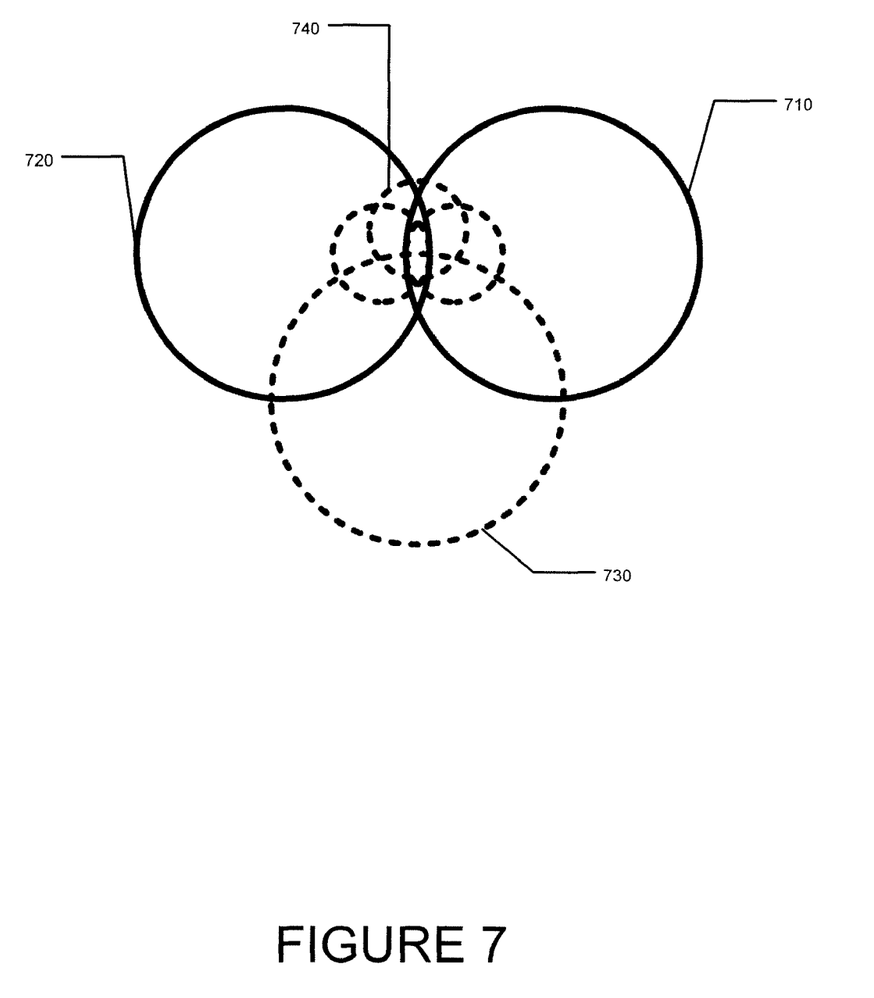
FIG. 7 illustrates an exemplary beam pattern relating to the method depicted in FIG. 6.

FIG. 7 illustrates an exemplary beam pattern formed by providing the calibration signal to the 90-degree, 270-degree and 180-degree elements in the present example. The beam from the 90-degree element 710 and the 270-degree element 720 are in phase with each other. As with the previously-described method, any calibration signal having any desired characteristics may be used in conjunction with the present invention. This method may also be practiced in conjunction with any appropriate antenna.

An intermix signal is received by another element of the antenna (620) (such as the 0-degree element 210 in the previous example), and an amplitude characteristic is measured for the received intermix signal (630). As discussed previously, any desired amplitude characteristic(s) may be measured for the intermix signal, such as a peak amplitude, trough amplitude, null, and/or any intermediate amplitude. The phase of the calibration signal provided to the third element can be varied until a desired amplitude characteristic is measured for the intermix signal. For example, the phase of the calibration signal provided to the 180-degree element may be adjusted until a null amplitude is measured at the 0-degree element 210.

The amplitude characteristic(s) of the intermix signal measured by the 0-degree element may be used to determine a phase offset that can be used to adjust the calibration signal provided to the 180-degree element so that signals transmitted from all four elements in the antenna 130 (the 0-degree element 210, 90-degree element 220, 180-degree element 230, and 270-degree elements) are in phase with each other.

A phase offset may be determined based on one or more amplitude characteristics (640). The determined phase offset can be used to adjust the phase of one or more signals from the transceiver 100 to the antenna 130 to generate a desired beam pattern from the antenna 130. In the present exemplary embodiment, determining the phase offset includes determining the phase of the calibration signal provided to the 180-degree element that results in a predetermined amplitude characteristic (e.g., a null) for the intermix signal measured by the 0-degree element. The phase of the signal provided to the 180-degree element may be adjusted until the predetermined amplitude characteristic for the intermix signal is measured.

The adjusted phase for the calibration signal may be used to determine the phase offset that brings the signals transmitted by all four antenna elements in phase with each other. The phase of a signal provided to the 180-degree element can then be adjusted by the phase offset to bring the signals transmitted from the four elements (210, 220, 230, and 240) in-phase with each other. As discussed previously, the phase offset compensates for phase shifting due to antenna feed lines or other sources. The phase offset may be applied to any desired signal to be transmitted using the antenna 130, such as a TCAS reply signal.

Since the 0-degree element 210 and 180-degree element 230 are 180 degrees apart, the intermix signal measured by the 0-degree element 210 includes the signal from the backlobe 740 of the 180-degree element 230, as opposed to the main lobe of the 180-degree element 730. In order to produce a null amplitude intermix signal at the 0-degree element, the main lobe of the 180-degree element 210 should be in-phase with the signals from the 270-degree element 240 and 90-degree element 220, or at −120 degrees.

In some cases, the backlobe produced by an antenna element may not be −180 degrees out of phase from the main lobe due to the physical placement of the antenna elements within an antenna. In the present example, the backlobe, also known as the "reverse beam," is −155 degrees out of phase from the main lobe, also known as the "forward beam," in the exemplary antenna. Since the reverse beam from the 180-degree element 230 is −155 degrees out of phase from the forward beam, adjusting the phase of the forward beam by −25 degrees results in the reverse beam being −180 degrees out of phase from the forward beam (−155−25=−180).

Figure 8:
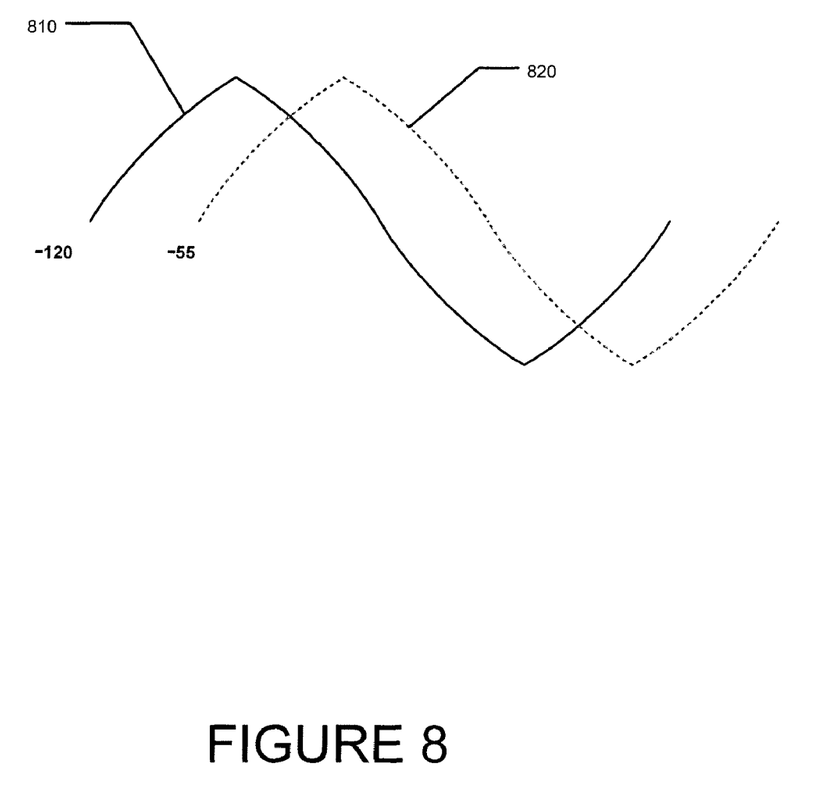
FIG. 8 is a timing diagram relating to the method depicted in FIG. 6.

FIG. 8 illustrates an exemplary phase relationship for an intermix signal generated by the method depicted in FIG. 6 and using the antenna array 130 depicted in FIG. 2. The phase of a calibration signal 810 from the transceiver 100 to the 270-degree element 240 is shifted by −120 degrees due to the antenna cabling to the 270-degree element. The signal from the opposing 90-degree element 220 is phase matched to the signal from the 270-degree element 240 (i.e. also −120 degrees) by shifting the phase of the calibration signal by −90 degrees (with −30 degrees phase shift being provided by the cabling between the transceiver 100 and the 270-degree element 240. The phase offset for matching of the opposing 270-degree and 90-degree elements can be obtained using the method discussed previously. The calibration signal provided to the 180-degree element 820 is phase shifted by −55 degrees after passing through the antenna cabling between the transceiver 100 and antenna array 130.

Accordingly, the signal to both the 180-degree element 210 and the 0-degree elements are adjusted by −65 degrees (−55−65=−120). Additionally, as discussed previously, the signal to the 0-degree element 210 is shifted by an additional −45 degrees to bring it in phase with the 180-degree element 230, for a total phase shift of −110 degrees. These phase offsets can be used on any signals transmitted through the antenna 130 in any desired beam pattern, such as in an omnidirectional TCAS reply transmission.

While the example above describes the use of this method with particular elements of a directional antenna, systems and methods of the present invention can be performed to calibrate any antenna with any suitable number of elements and with any amount of phase shift due to cabling or other sources.

Any combination and/or subset of the elements of the methods depicted herein may be practiced in any suitable order and in conjunction with any system, device, and/or process. The methods described herein can be implemented in any suitable manner, such as through software operating on one or more computer systems.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims.

What is claimed is:

1. A method for determining a phase offset comprising:
   simultaneously providing a calibration signal to a first element of an antenna and a second element of the antenna opposite the first element;
   receiving a first intermix signal by a third element of the antenna;
   measuring an amplitude characteristic for the first intermix signal;
   determining the phase offset based on the amplitude characteristic;
   receiving a second intermix signal by a fourth antenna element; and
   measuring a second amplitude characteristic for the second intermix signal received by the fourth element;
   wherein determining the phase offset comprises:
   determining a first phase for the calibration signal from the first antenna element that produces a first predetermined amplitude characteristic for the first intermix signal;
   determining a second phase for the calibration signal from the first antenna element that results in a second predetermined amplitude characteristic for the second intermix signal; and
   employing a determined value of the first phase and a determined value of the second phase to determine the phase offset.

2. The method of claim 1, wherein determining the phase offset further comprises:
   adding the determined value of the first phase to the determined value of the second phase and dividing the resulting sum by two.

3. The method of claim 1, wherein the first predetermined amplitude characteristic is the same as the second predetermined amplitude characteristic.

4. The method of claim 3, wherein the first predetermined amplitude characteristic and the second predetermined amplitude characteristic include at least one of a peak amplitude and a null amplitude.

5. The method of claim 1, further comprising adjusting a TCAS reply signal using the phase offset.

6. A system comprising:
   a processor;
   an antenna; and
   a memory in communication with the processor and storing instructions that, when executed by the processor, cause the processor to:
   simultaneously provide a calibration signal to a first element of the antenna and a second element of the antenna opposite the first element;
   receive a first intermix signal by a third element of the antenna;
   measure an amplitude characteristic for the first intermix signal; and
   determine a phase offset based on the amplitude characteristic;
   wherein the memory further stores instructions to cause the processor to:
   receive a second intermix signal by a fourth antenna element; and
   measure a second amplitude characteristic for the second intermix signal received by the fourth element;
   wherein determining the phase offset comprises:
   determining a first phase for the signal from the first antenna element that produces a first predetermined amplitude characteristic for the first intermix signal;
   determining a second phase for the signal from the first antenna element that results in a second predetermined amplitude characteristic for the second intermix signal; and
   employing a determined value of the first phase and a determined value of the second phase to determine the phase offset.

7. The system of claim 6, wherein the first, second, third, and fourth antenna elements are radially disposed around an axis of the antenna.

8. The system of claim 6, further comprising a beam-forming network coupled to the antenna.

9. The system of claim 8, wherein the beam-forming network is integrated with the antenna.

10. A method for determining a phase offset comprising:
    simultaneously providing a calibration signal to a first element of an antenna, to a second element of the antenna opposite the first element, and to a third element of the antenna, wherein the calibration signal transmitted from the first antenna element is in phase with the calibration signal transmitted from the second antenna element;
    receiving an intermix signal by a fourth element of the antenna;
    measuring an amplitude characteristic for the intermix signal; and
    determining the phase offset based on the amplitude characteristic;
    wherein determining the phase offset includes determining a phase for the calibration signal from the third antenna element that produces a predetermined amplitude characteristic for the intermix signal and employing a determined value of the phase to determine the phase offset.

11. The method of claim 10, wherein predetermined amplitude characteristic includes at least one of a peak amplitude and a null amplitude.

12. The method of claim 10, wherein third element is opposite the fourth element.

13. The method of claim 10, further comprising adjusting a TCAS reply signal using the phase offset.

14. A system comprising:
a processor;
an antenna;
a memory in communication with the processor and storing instructions that, when executed by the processor, cause the processor to:
simultaneously provide a calibration signal to a first element of the antenna and a second element of the antenna opposite the first element, wherein the calibration signal transmitted from the first antenna element is in phase with the calibration signal transmitted from the second antenna element;
provide the calibration signal to a third element of the antenna;
receive an intermix signal by a fourth element of the antenna;
measure an amplitude characteristic for the intermix signal; and
determine a phase offset based on the amplitude characteristic;
wherein determining the phase offset includes determining a phase for the calibration signal from the third antenna element that produces a predetermined amplitude characteristic for the intermix signal and employing a determined value of the phase to determine the phase offset.

15. The system of claim 14, wherein the first, second, third, and fourth antenna elements are radially disposed around an axis of the antenna.

16. The system of claim 14, further comprising a beam-forming network coupled to the antenna.

17. The system of claim 16, wherein the beam-forming network is integrated with the antenna.

* * * * *